United States Patent [19]

Yamamoto et al.

[11] Patent Number: 4,739,311

[45] Date of Patent: Apr. 19, 1988

[54] TRIM CONTROL DEVICE FOR RADIO REMOTE CONTROL SYSTEM FOR MODEL DRIVE UNIT

[75] Inventors: Michio Yamamoto; Satoshi Sekiya, both of Mobara, Japan

[73] Assignee: Futaba Denshi Kogyo Kabushiki Kaisha, Mobara, Japan

[21] Appl. No.: 932,318

[22] Filed: Nov. 19, 1986

[30] Foreign Application Priority Data

Nov. 25, 1985 [JP] Japan .............................. 60-264124

[51] Int. Cl.[4] .............................................. H04Q 9/14

[52] U.S. Cl. .............................. 340/696; 340/825.69; 364/434

[58] Field of Search .............. 340/696, 825.63, 825.69, 340/825.72; 244/178, 189, 76 R; 364/424, 434

[56] References Cited

U.S. PATENT DOCUMENTS

| | | | |
|---|---|---|---|
| 4,158,812 | 6/1979 | Hellman et al. | 340/696 |
| 4,177,426 | 12/1979 | Gaishin et al. | 340/825.69 |
| 4,420,808 | 12/1983 | Diamond et al. | 364/434 |
| 4,580,210 | 4/1986 | Nordström | 364/424 X |

*Primary Examiner*—Glen R. Swann, III
*Assistant Examiner*—Tat K. Wong
*Attorney, Agent, or Firm*—Oblon, Fisher, Spivak, McClelland & Maier

[57] ABSTRACT

A radio remote control system for a model drive unit such as a model plane or the like is disclosed which is capable of eliminating retrimming of the same controlled object of which the trim adjustment was completed to substantially simplify the troublesome trim adjustment. The system includes a trim control voltage code memory which serves to separately readably stores therein trim control voltage codes representing trim control voltages of trim controllers concerned with a previously controlled object, so that the trim control voltage codes corresponding to the positions of the trim controllers during the previous control operation may be read out from the memory during recontrol of the previously controlled object. The system may also include a digital adder for carrying out addition of the trim control voltage codes of the previously controlled object read out from the memory and the trim control voltage codes concerned with the same controlled object currently controlled.

2 Claims, 3 Drawing Sheets

TRIM CONTROL DEVICE FOR RADIO REMOTE CONTROL SYSTEM FOR MODEL DRIVE UNIT

BACKGROUND OF THE INVENTION

1. Field of the Invention

This invention relates to a radio remote control system for a model drive unit such as a model plane or the like which is adapted to output a transmission signal representing a control data from a transmission section including a radio transmitter and receive the signal at a receiving section including a radio receiver mounted on a controlled object such as a model car, a model plane or the like to carry out remote control of variable sections of the controlled object, and more particularly to a radio remote control system which is improved to replace one controlled object corresponding to one transmission section with one of a plurality of controlled objects every time to delete adjustment operation due to a difference between individual controlled objects which has been conventionally required in connection with a trim data every control operation for finely adjusting relationships between a control data from a transmission section and the amounts of displacement of variable sections of a controlled object corresponding to the control data.

2. Description of the Prior Art

A conventional radio remote control system of this type includes a transmission section which is typically constructed in such a manner as shown in FIG. 3.

More particularly. in the conventional control system, variable resistors 2 and 3 operationally connected to one control lever 1 on a control panel and a variable resistor 4 operationally connected to another control lever 1' on the control panel are separately arranged with respect to channels respectively allocated to variable sections of a controlled object. The variable resistors 2, 3 and 4 each are connected at one end thereof to a common power supply V and at the other end thereof to the grounds to form a bleeder. Sliders **2*a*, 3*a* and 4*a* of the resistors 2, 3 and 4 are connected to one input terminals of voltage adding circuits 5, 6 and 7, respectively. Thus, the variable resistors 2, 3 and 4 constitute main control voltage generating circuits 2A, 3A and 4A**, respectively.

Now, the variable sections concerned with control operation will be exemplified. When a controlled object is, for example, a model plane, the variable resistor 2 allocated to a first channel is in charge of control of an aileron (aileron of main wing), the variable resistor 3 for a second channel is in charge of control of an elevator (aileron of horizontal tail) and the variable resistor 4 for a third channel is in charge of control of a throttle.

The two control lever 1 and 1' on the control panel are generally operable every direction, and the variable resistors 2, 3 and 4 are separately operated corresponding to the operation of the control levers 1 and 1' every displacement region of the levers.

In addition, the conventional radio remote control system includes trim controllers 8, 9 and 10 provided corresponding to the respective displacement regions of the two control levers 1 and 1' and variable resistors 11, 12 and 13 arranged on the control panel in a manner to be operationally connected to the trim controllers 8, 9 and 10, respectively. The variable resistors 11, 12 and 13 each are connected at one end thereof to the common power supply V and at the other end thereof to the grounds. Sliders **11*a*, 12*a* and 13*a* of the resistors 11, 12 and 13 are connected to the other input terminals of the voltage adding circuits 5, 6 and 7**, respectively.

Thus, the variable resistors 11, 12 and 13 constitute trim control voltage generating circuits 11A, 12A and 13A, respectively.

The voltage adding circuits 5, 6 and 7 are connected at output terminals thereof to input terminals of a multiplexer 14, respectively, which is connected in turn at an output terminal thereof to a subsequent analog to digital converter 15. The analog to digital converter 15 is then connected at an output terminal thereof through a data bus **15*a* comprising a plurality of wires and led out therefrom to an input terminal of a parallel/serial conversion circuit 16, which is connected in turn at an output terminal thereof through a pair of data lines 16*a* to an input terminal of a radio transmitter 17 which is provided with a transmitting antenna 17*a***.

Also connected to the parallel/serial conversion circuit 16 are a clock pulse oscillating circuit 18 and an address counter 19. The counter 19 is connected at an output terminal thereof to an address terminal of the multiplexer 14 through an address bus **19*a*** comprising a plurality of wires and extending therebetween.

In the conventional control system constructed as described above, the operation of the two control levers 1 and 1' in the respective displacement regions for control causes the sliders **2*a*, 3*a* and 4*a* of the variable resistors 2, 3 and 4 to be slided, so that main control voltages E1, E2 and E3 corresponding to the amounts of displacement of the control levers 1 and 1' may appear at the sliders 2*a*, 3*a* and 4*a*, which are then concurrently supplied through the voltage adding circuits 5, 6 and 7 to the input terminals of the multiplexer 14**, respectively.

Now, supposing that an address of the multiplexer 14 designates its first input terminal, the main control voltage E1 supplied to the first input terminal of the multiplexer 14 through the voltage adding circuit 5 is selected and appears at the output terminal of the multiplexer. The voltage E1 is then supplied to the analog to digital converter 15 and converted to a parallel digital code therein, which are supplied in the form of a main control voltage code C1 representing the main control voltage E1 through the data bus **15*a* to the parallel/-serial conversion circuit 16. The circuit 16 receiving the parallel main control voltage code C1 assembles the code C1 into an ordinal transmission code and converts the transmission code into a serial transmission code C2 of a bit rate defined by a frequency of a clock pulse S1 from the clock pulse oscillating circuit 18. The so-converted transmission code C2 is then transferred through the data lines 16 to the radio transmitter 17**, which transmits the code C2 to a radio receiver in a receiving section (not shown).

The parallel/serial conversion circuit 16 supplies a completion code C3 to the address counter 19 to carry out stepping of the code when it completes transfer of the transmission code C2 corresponding to one channel of the main control voltage code C1 derived from the main control voltage E1.

Then, the address counter 19 feeds a subsequent address code C4 through an address bus **19*a* to an address terminal of the multiplexer 14, so that the multiplexer 14 selects the main control voltage E2 supplied to the second input terminal thereof in response thereto and supplies it through the output terminal thereof to the analog to digital converter 15**.

Thus, every time when the transmission code C2 for the first channel representing one main control voltage is transmitted, the stepping of the address code C4 to the multiplexer 14 is carried out to select a subsequent main control voltage, so that the transmission code C2 for the second channel representing it may be transmitted. In a similar manner, a control data indicated by the amount of displacement of each of the control lever 1 and 1' in its displacement region is subjected to time-sharing transmission for each of the channels allocated to the respective variable sections, and then the receiving section which has received it by means of a radio receiver positionally changes each of the variable sections corresponding to the amount of displacement of each of the control levers 1 and 1' to carry out remote control of the controlled object.

In the conventional control system described above, trimming or trim adjustment is required to coincide the substantially neutral position of each of the variable sections of the controlled object in an actual driving state with the mechanical neutral position of each of the control levers 1 and 1' on the transmission section side in view of a difference in characteristics or the like between individual controlled objects. In such operation, when an operator separately operates the trim controllers 8, 9 and 10 to move the sliders 11*a*, 12*a* and 13*a* of the variable resistors 11, 12 and 13, trim control voltages e1, e2 and e3 corresponding to the amounts of displacement of the trim controllers 8, 9 and 10 appear at the sliders 11*a*, 12*a* and 13*a*, which are then supplied to the one input terminals of the voltage adding circuits 5, 6 and 7, respectively. The voltage adding circuits 5, 6 and 7 superposedly add the trim control voltages e1, e2 and e3 to the main control voltages E1, E2 and E3 supplied to the other input terminals thereof in an analog manner to obtain control voltages (E1+e1), (E2+e2) and (E3+e3) and then supply the so-obtained control voltages to the input terminals of the multiplexer 14, respectively.

The control voltages alternatively selected by the multiplexer 14 are converted into parallel control voltage codes C0 by means of the analog to digital converter 15. A signal treatment of the control voltages in the parallel/serial conversion circuit 16 and the subsequent elements is carried out in substantially the same manner as that of the main control voltage codes C1 described above.

Thus, the operation of the trim controllers 8, 9 and 10 at the transmission section for adjusting the trim control voltages e1, e2 and e3 causes control codes representing the substantially neutral positions of the variable sections of the controlled object to be transmitted from the receiving section to the transmission section while keeping each of the control levers 1 and 1' of the transmission section at its mechanically neutral position.

The conventional radio remote control system described above is convenient in that when only one controlled object provided with one receiving section corresponding to one transmission section is solely or exclusively specified, it is merely required to stationarily store the trim control voltages el, e2 and e3 of the variable sections determined depending upon the specific characteristics of the sole controlled object as the mechanical positions of the trim controllers 8, 9 and 10 of the transmission section in the trim controllers. However, it has been recently desired to correspond a plurality of controlled objects to one transmission section in a manner to be replaced one by one with respect to the transmission section so that satisfied applicability to various controlled objects may be met and such a control system of a high grade may be manufactured at a low cost. The replacement of a controlled object corresponding to one transmission section with another controlled object for such a purpose requires to change the positions of the trim controllers 8, 9 and 10 depending upon the specific characteristics of each of the controlled objects every replacement, resulting in the trimming or trim adjustment being highly troublesome.

SUMMARY OF THE INVENTION

The present invention has been made in view of the foregoing disadvantage of the prior art.

Accordingly, it is an object of the present invention to provide a trim control device for a radio remote control system for a model drive unit such as a model plane or the like which is capable of eliminating the retrimming of the same controlled object of which the trim adjustment was completed to essentially simplify the trim adjustment.

It is another object of the present invention to provide a trim control device for a radio remote control system for a model unit which is capable of compensating a variation of proper values of trim control voltages of the same controlled object with time between previous control operation and current control operation at the time of the current control operation to allow the above-noted advantage to be more effectively exhibited.

In accordance with the present invention, a trim control device for a radio remote control system is provided. The trim control device includes a trim control voltage code memory which functions to store trim control voltage codes representing trim control voltages of trim controllers concerned with a previously controlled object while making the separate readout of the trim control voltage codes possible. Such construction permits the trim control voltage codes representing the trim control voltages of the trim controllers at previous control operation to be read out from the trim control voltage code memory during the recontrol operation of the same controlled object previously controlled, to thereby delete a necessity of carrying out the trim adjustment again. This results in the above-noted disadvantage of the prior art being effectively eliminated.

Also, in accordance with the present invention, there is also provided a trim control device for a radio remote control system which includes, in addition to the above-noted trim control voltage code memory, a digital adder for carrying out addition of the trim control voltage codes of the previously controlled object read out from the trim control voltage code memory and trim control voltage codes concerned with the same controlled object currently controlled. Such construction, when the previously controlled object is to be controlled again, not only eliminates a necessity of readjusting the trim controllers but compensates a variation of a proper value of each of trim control voltages of the same controlled object with time between the previous control operation and the recontrol or current control operation by deviating the mechanical neutral position of each of the trim controllers during the current control, to thereby more effectively eliminate the above-noted disadvantage of the prior art.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein.

DETAILED DESCRIPTION OF THE PREFERRED EMBODIMENTS

Now, a trim control device for a radio remote control system according to the present invention will be described hereinafter with reference to the accompanying drawings.

Figure 1:
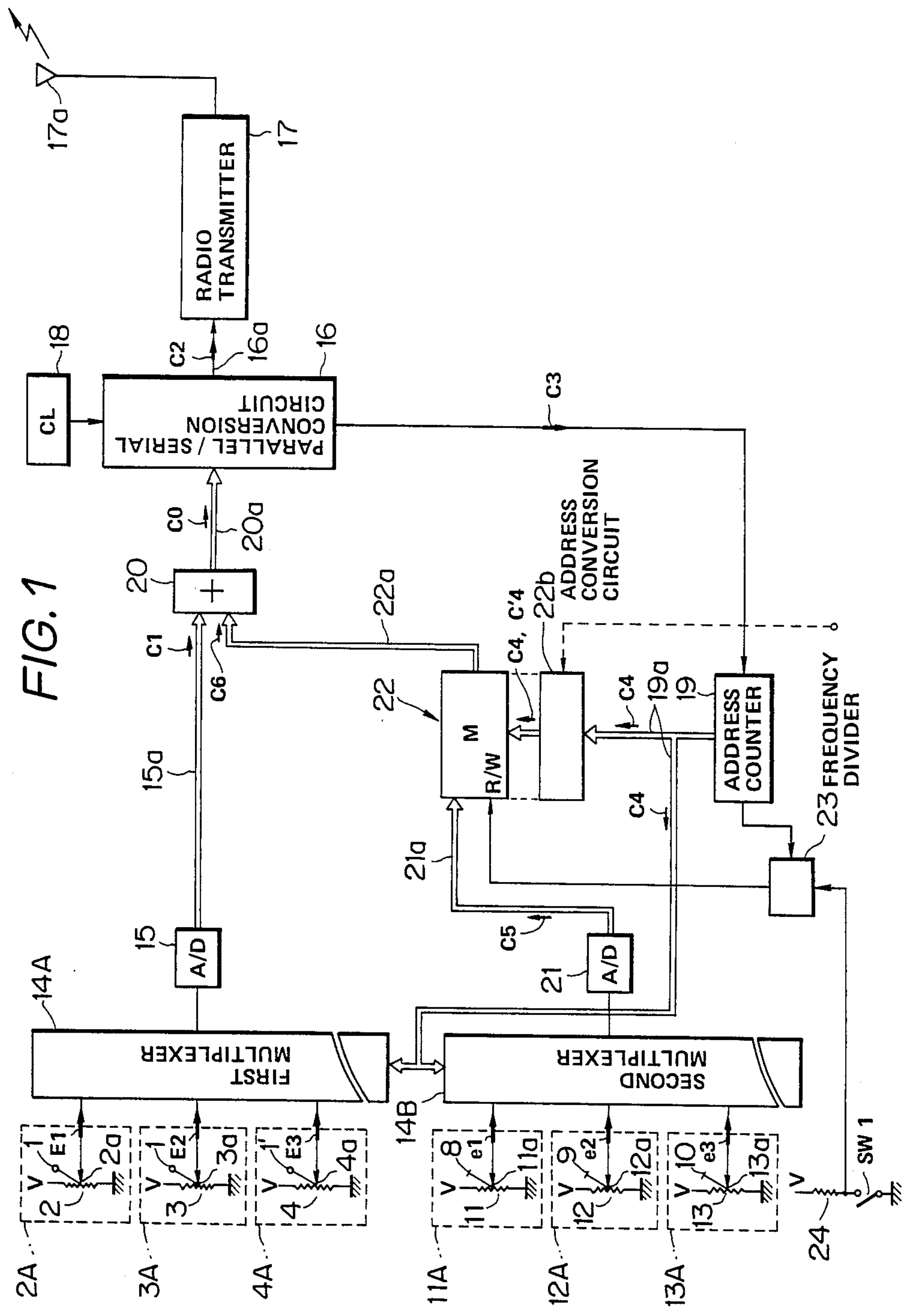
FIG. 1 is a block diagram showing an embodiment of a trim control device for a radio remote control system for a model drive unit according to the present invention.

FIG. 1 illustrates an embodiment of the present invention. In a trim control device for a radio remote control system of the illustrated embodiment, variable resistors 2, 3 and 4 constituting main control voltage generating circuits 2A, 3A and 4A have sliders *2a*, *3a* and *4a* connected to input terminals of a first multiplexer 14A, respectively; whereas variable resistors 11, 12 and 13 constituting trim control voltage generating circuit 11A, 12A and 13A have sliders *11a*, *12a* and *13a* connected to input terminals of a second multiplexer 14B, respectively.

An output terminal of the first multiplexer 14A is connected to an input terminal of a first analog to digital converter 15, of which an output terminal is then connected through a data bus *15a* comprising a plurality of wires and led out therefrom to one of input terminals of a digital adder 20. The digital adder 20 is then connected at an output terminal thereof through a transmission code bus *20a* comprising a plurality of wires to an input terminal of a parallel/serial conversion circuit 16.

The second multiplexer 14B is connected at an output terminal thereof to an input terminal of a second analog to digital converter 21, of which an output terminal is connected through a plurality of wires or a trim control voltage code bus *21a* and led out therefrom to an input terminal of a trim control voltage code memory 22.

Also, the trim control voltage code memory 22 is connected at an output terminal thereof to a trim control voltage code bus *22a* comprising a plurality of wires, which is then connected to the other input terminal of the digital adder 20.

Also, the illustrated embodiment includes an address counter 19 having an address bus *19a* comprising a plurality of wires and led out from an output terminal thereof. The address bus *19a* is connected in turn to an input terminal of an address conversion circuit *22b* provided in the trim control voltage code memory 22 and then connected through the conversion circuit *22b* to an address bus of the memory 22. Also, the conversion circuit *22b* has an address setting terminal connected to a suitable setting means on a control panel in a manner to be manually setable. The address bus *19a* outside of the memory element is branched on the way to the address conversion circuit *22b* and commonly connected to address terminals of the first and second multiplexers 14A and 14B. Also, the trim control voltage code memory 22 is connected at a read-write mode control terminal thereof to an output terminal of a frequency divider 23 which is also connected to an uppermost stage of the address counter 19. The frequency divider 23 is also connected at an enable terminal thereof to one end of a constantly open two-position switch SW1 of which the other end is connected to the grounds. The one end of the switch SW1 is also connected through a resistor 24 to a power supply.

Figure 3:
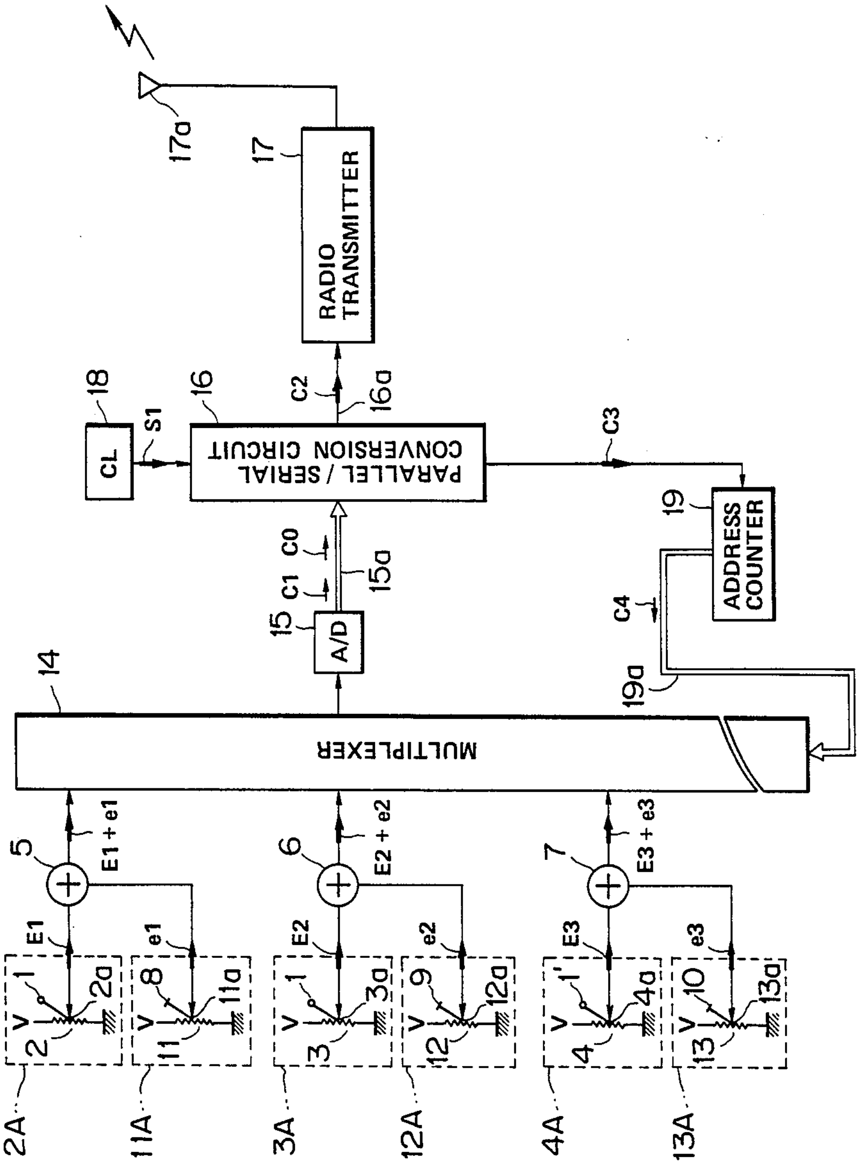
FIG. 3 PRIOR ART
FIG. 3 is a block diagram showing a conventional remote control system.

The remaining part of the illustrated embodiment may be constructed in substantially the same manner as the prior art shown in FIG. 3.

In the control system of the illustrated embodiment constructed as described above, the adjustment of trim control voltages e1, e2 and e3 which causes each of control levers 1 and 1' to be at its mechanical neutral position corresponding to the substantially neutral position of each of variable sections of one controlled object during control of the controlled object is carried out by changing the constantly open two-position switch SW1 for setting a trim control voltage to a closed state by an operator to connect the enable terminal of the frequency divider 23 to the grounds, resulting in the frequency divider being transferred to an actuation state.

This causes the address counter 19 to carry out stepping in the same manner as the prior art shown in FIG. 3, during which an address of the trim control voltage code memory 22 allocated to correspond to a pair of the input terminals of each of the first and second multiplexers 14A and 14B concurrently switched corresponding to the stepping of the address counter 19 in synchronism with the change-over of the multiplexers is cycled in the number of times predetermined depending upon a dividing ratio of the frequency divider 23. In the meantime, the memory 22 which has actuated in a read mode is changed to a write mode and kept at the write mode for a period of time during which the address is cycled in the predetermined number of times. Thus, in such a state, the trim control voltage code memory 22 alternately repeats the operation of the write mode and that of the read mode every time when the address which carries out the stepping in synchronism with the change-over of the first and second multiplexers 14A and 14B is cycled in the predetermined number of times. When the operator separately operates the trim controllers 8, 9 and 10 to cause the trim control voltage generating circuits 11A, 12A and 13A to generate desired trim control voltages e1, e2 and e3 and the voltages are supplied to the input terminals of the second multiplexer 14B, respectively, the multiplexer 14B alternatively selects the trim control voltages e1, e2 and e3 in turn depending upon address codes C4 supplied from the address counter 19 through the address bus *19a* thereto and supplies them to the second analog to digital converter 21. Then, the converter 21 converts in turn each of the control voltages into a parallel trim control voltage code C5 and supplies it through the trim control voltage code bus *21a* to the input terminal of the trim voltage control code memory 22. In the meantime, the memory 22, as described above, alternately carries out the write mode operation and read mode operation, so that the trim control voltage code C5 read in the memory 22 at the operation of each of the trim controllers 8, 9 and 10 may be read out from the memory 22 with a little delay and supplied in the form of a previous trim control voltage code C6 through the trim control voltage code bus 22a to the one input terminal of the digital adder 20.

At this time, a little delay occurring between both trim control voltage codes C5 and C6 does not adversely affect operation of the trim controllers in practice so far as the velocity of cycling of the address is selected to be sufficiently large and the dividing ratio of the frequency divider 23 is suitably selected.

During the operation of adjusting the trim control voltages, the control levers 1 and 1' each are kept at the neutral position, accordingly, the main control voltage generating circuits 2A, 3A and 4A and the first analog to digital converter 15 operate in the same manner as in the conventional system shown in FIG. 3, so that the main control voltage codes C1 may be supplied from the analog to digital converter 15 through the data bus 15a to the one input terminal of the digital adder 20. At this time, the main control voltage codes C1 each are at a state of "0", resulting in the trim control voltage codes C6 supplied to the other input terminal of the adder 20 passing therethrough and being supplied in the form of control voltage codes C0 through the control voltage code bus 20a to the parallel/serial conversion circuit 16. Subsequent operation is carried out in substantially same manner as in the conventional system shown in FIG. 3, so that deviation depending upon each of the trim controllers may be applied to each of the variable sections of the controlled object, resulting in the variable sections each being at the substantially neutral position.

Then, when the operator carries out control operation using the same controlled object as described above, the switch SW1 is still kept at the closed state and the trim control voltage code memory 22 continues to alternately carry out operations of both read and write modes, so that the trim control voltages e1, e2 and e3 for the controlled object may be mechanically stored and maintained as the positions of the trim controllers 8, 9 and 10 in the control operation.

Subsequently, when the operator carries out control operation using another controlled object instead of the above-described controlled object, address codes C'4 designate a different address region of the trim control voltage code memory 22 although the memory still alternately carries out both mode operations. Accordingly, the trim control voltage codes C6 stored for the original controlled object before the substitution are never substituted for different ones, so that it may be deemed that the replaced controlled object possesses another trim control voltage code memory 22 which is entirely independent from the above-described memory 22.

More particularly, when the operator sets and operates the address conversion circuit 22b using a suitable setting means on a control panel, address conversion is carried out so that the address codes C4 from the address counter 19 may be converted to different address codes C'4 which correspond to the address codes C4 at a ratio of 1:1, respectively, and designate an address region comprising a different address group. Addresses designated by the converted address codes C'4 serve to store trim control voltage codes C5 concerned with the replaced controlled object.

It should be noted that in the basic structure of the present invention which is adapted to make the storing of trim control voltage codes of the sole controlled object possible, it is not necessarily required to arrange the address conversion circuit 22b.

When subsequent control operation is to be carried out using the first or original controlled object of which the trim adjustment was completed in place of the replaced controlled object, the operator changes the constantly open two-position switch SW1 to an open state to lock the enable terminal of the frequency divider 23 at a state of "1". This causes the frequency divider 23 to be at a nonoperable state and an output thereof to be locked at a state of "0", resulting in the trim control voltage code memory 22 being operated while being kept at its read mode. Accordingly, when the setting of address conversion in the address conversion circuit 22b is returned to that concerned with the original controlled object, the trim control voltage codes of the trim controllers 8, 9 and 10 concerned with the original controlled object are read out in turn from the memory 22 and supplied in the form of previous trim control voltage codes C6 through the trim control voltage code bus 22a to the one input terminal of the digital adder 20.

Whereas, to the other input terminal of the digital adder 20, main control voltage codes C1 each carrying out stepping in synchronism with the stepping of each of the trim controllers 8, 9 and 10 of the previous trim control voltage codes C6 are supplied through the data bus 15a and, during the control operation, the main control voltage codes C1 indicate positions of the control levers 1 and 1'. The digital adder 20 carries out digital addition of the main control voltage codes C1 and the previous trim control voltage codes C6 and a result of the addition is supplied in the form of control voltage codes C0 through the control voltage code bus 20a to the parallel/serial conversion circuit 16.

Thus, the original controlled object of which the trim adjustment was completed at the previous control operation is controlled during the current control operation in a state that the variable sections are subjected to trim adjustment in the same amounts as in the previous control operation.

As can be seen from the foregoing, in the first embodiment shown in FIG. 1, the trim control voltages e1 to e3 generated depending upon the positions of the trim controllers 8 to 10 are converted to the parallel trim control voltage codes C5 in the second analog to digital converter 21 and separately readably stored in the trim control voltage code memory 22, from which the trim control voltage codes C6 indicating the control voltages e1 to e3 of the previously controlled object are read out. Whereas, the main control voltages E1 to E3 generated in the main control voltage generating circuits 2A to 4A depending upon the operational positions of the control levers 1 and 1' during the current control operation are converted, in the first analog to digital converter 15, to the parallel main control voltage codes C1, which are then added to the above-noted trim control voltage codes C6 read out from the memory 22 in the digital adder 20. The result is transferred in the form of the control voltage codes C0 to the parallel/-serial conversion circuit 16 and converted to the serial transmission codes C2, which are then fed to the receiving section of the system.

Now, a second embodiment of a trim control device for a radio remote control system according to the present invention will be described with reference to FIG. 2.

In the second embodiment, a trim control voltage code bus 22a led out from an output of a trim control voltage code memory 22 is connected to one of input terminals of a first digital adder 30. To the other input terminal of the first digital adder 30 is connected a branch of a trim control voltage code bus 21*a* extending from an output terminal of a second analog to digital converter 21 to an input terminal of the trim control voltage code memory 22.

The first digital adder 30 is connected at an output terminal thereof through an immediate trim control voltage code bus 30*a* led out therefrom to one of input terminals of a second digital adder 31. To the other input terminal of the second digital adder 31 is connected a data bus 15*a* extending from the first analog to digital converter 15. Also, the adder 31 is connected at an output terminal thereof through a data bus 31*a* extending therefrom to an input terminal of a parallel/serial conversion circuit 16. The bus 30*a* led out from the first digital adder 30 is branched on the way and connected to one of input terminals of a digital comparator 25, of which the other input terminal is connected to an output terminal of an upper limit trim value setting circuit 26 and an output terminal is connected to both an inhibition terminal of the second digital adder 31 and an input terminal of an alarm indicator 27.

To a read-write mode control terminal of the trim control voltage code memory 22 is connected an output terminal of a monostable multivibrator 28, of which an input terminal is connected to one end of a constantly open one-position switch SW2 for setting trim control voltages of which the other end is grounded. The one end of the switch SW2 is also connected through a resistor 29 to a power supply V. The remaining part of the second embodiment may be constructed in the same manner as the first embodiment shown in FIG. 1.

In the control system of the second embodiment constructed as described above, the adjustment of trim control voltages e1, e2 and e3 is carried out in such a manner that an operator operates the trim controllers 8, 9 and 10 while placing each of control levers 1 and 1' at its neutral position. This results in trim control voltage codes C5 appearing on the trim control voltage bus 21*a* due to cooperation among the address counter 19, second mutiplexer 14B and second analog to digital converter 21 as in the embodiment shown in FIG. 1. At this time, the monostable multivibrator 28 falls into a stable state, and the trim control voltage code memory 22 receives an output "0" of the monostable multivibrator 28 at the read-write mode control terminal and operates in its read mode, so that the memory 22 may cause the trim control voltage codes C5 which were originally cleared to "0" to be read out at the output terminal of the memory 22 in cooperation with the address counter 19, which are then supplied through the bus 22*a* to the one input terminal of the first digital adder 30, resulting in the adder 30 supplying the trim control voltage codes C5 on the bus 21*a* therefrom through the bus 30*a* to the one input terminal of the second digital adder 31.

At this time, the main control voltage codes C1 supplied through the bus 15*a* to the other input terminal of the adder 31 are also kept at a state of "0" because the control levers 1 and 1' each are at its neutral position, resulting in the trim control voltage codes C5 depending upon the position of each of the controllers 8, 9 and 10 at that time being supplied in the form of control voltage codes C'0 from the adder 31 through the data bus 31*a* to the parallel/serial conversion circuit 16. Subsequent operation of the embodiment is carried out in the same manner as the conventional system shown in FIG. 3, so that characteristics of a controlled object may be compensated to provide each of variable sections of the controlled object with deviation for ensuring the substantially neutral position of each of the variable sections.

The storing and maintaining of the trim control voltage codes C5 established according to the trim adjustment described above is accomplished in such a manner that the operator changes the constantly open one-position switch SW2 to a closed state and causes the monostable multivibrator 28 to be triggered only one time to shift the multivibrator to a metastable state. This causes the codes of "1" to be supplied from the multivibrator 28 to the read-write control terminal of the trim control voltage code memory 22, so that the operation of the memory 22 is carried out in its read mode for a metastable period or a period of time during which the multivibrator is kept at the metastable state and ensured with respect to address cycles of the number of times determined depending upon the metastable period.

The address counter 19, second multivibrator 14B and trim control voltage code memory 22 cooperate to cause the trim control voltage codes C5 depending upon the positions of the trim controllers 8, 9 and 10 of the trim control voltage generating circuits 11A, 12A and 13A to be stored in the addresses of the memory 22, respectively. The operation of the address conversion circuit 22*b* for allocating an address region of the memory 22 to each of controlled objects is carried out in the same manner as the system shown in FIG. 1.

When the re-control operation of the above-described controlled object of which the trim adjustment was completed is to be carried out, the trim controllers 8, 9 and 10 and control levers 1 and 1' each are first placed at its neutral position. At this time, previous trim control voltage codes C6 which had been stored and maintained in the trim control voltage code memory 22 operated in its read mode since the previous trim adjustment of each of the trim controllers 8, 9 and 10, have been already read out from the memory 22 and supplied through the bus 22*a* to the one input terminal of the first digital adder 30, whereas the trim control voltage codes C5 of "0" corresponding to the neutral position of each of the trim controllers 8, 9 and 10 at the current control operation have been already supplied through the bus 21*a* to the other input terminal of the adder 30; so that the previous trim control voltage codes C6 concerned with the previous control operation may be transferred to the second digital adder 31. Subsequently, the previous trim control voltage codes C6 are added in the adder 31 to the main control voltage codes C1 of "0" corresponding to the neutral position of each of the control levers 1 and 1' and then transferred in the form of control voltage codes C'0 to the parallel/serial conversion circuit 16. Thus, deviation in the same amounts as in the trim adjustment during the previous control operation is applied to the variable sections of the controlled object.

Then, when the operator moves each of the trim controllers 8, 9 and 10 placed at the neutral position to a suitable position, the trim control voltage codes C5 supplied through the bus 21*a* to the first digital adder 30 are adapted to indicate the current positions of the trim controllers 8, 9 and 10 and added in the adder 30 to the previous trim control voltage codes C6 supplied through the bus 22*a* thereto. A result of the addition is supplied in the form of immediate trim control voltage codes C7 through the bus 30*a* to the second digital adder 31 and then transferred in the form of control voltage codes C'0 through the adder 31 to the parallel/-serial conversion circuit 16.

Thus, the variable sections of the controlled object each are applied thereto deviation in amounts represented by the immediate trim control voltage codes C7 or deviation corresponding to the sum of deviation applied to the variable sections of the controlled object during the previous control operation and deviation depending upon the position of each of the trim controllers 8, 9 and 10 at the current control operation.

This results in the operator carrying out the trim adjustment sufficient to compensate a variation of proper deviation of the same controlled object with time due to meteorological conditions every control operation.

Then, when the operator operates the control levers 1 and 1' for the control operation of the controlled object of which the trim adjustment was completed; the main control voltage generating circuits 2A, 3A and 4A, the first multiplexer 14A, the first analog to digital converter 15, and the second digital adder 31 cooperate with one another in the same manner as the cooperation of the main control voltage generating circuits 2A, 3A and 4A, the first multiplexer 14A, the first analog to digital converter 15, and the digital adder 20, to thereby cause the variable sections of the controlled object to be positionally changed depending upon the positions of the control levers 1 and 1'.

During the trimming or trim adjustment, the amounts of operation of the trim controllers 8, 9 and 10 are occasionally excessively increased due to any abnormality in the controlled object. In this instance, the immediate trim control voltage codes C7 from the first digital adder 30 and reference codes C8 representing an upper limit trim value set by a digital code setting means in the upper limit value setting circuit 26 or the like are compared with each other in the digital comparator 25, accordingly, the comparator 25 detects an increase in a value of the immediate trim control voltage codes C7 to the upper limit trim value and feeds alarm codes C9 to the alarm indicator 27, which then generates a visible and/or listenable alarm. At this time, the comparator 25 also supplies the alarm codes C9 in the form of an inhibition signal to the second digital adder 31 to prohibit the control voltage codes C'0 from being fed from the adder 31, to thereby stop the whole control operation.

Figure 2:
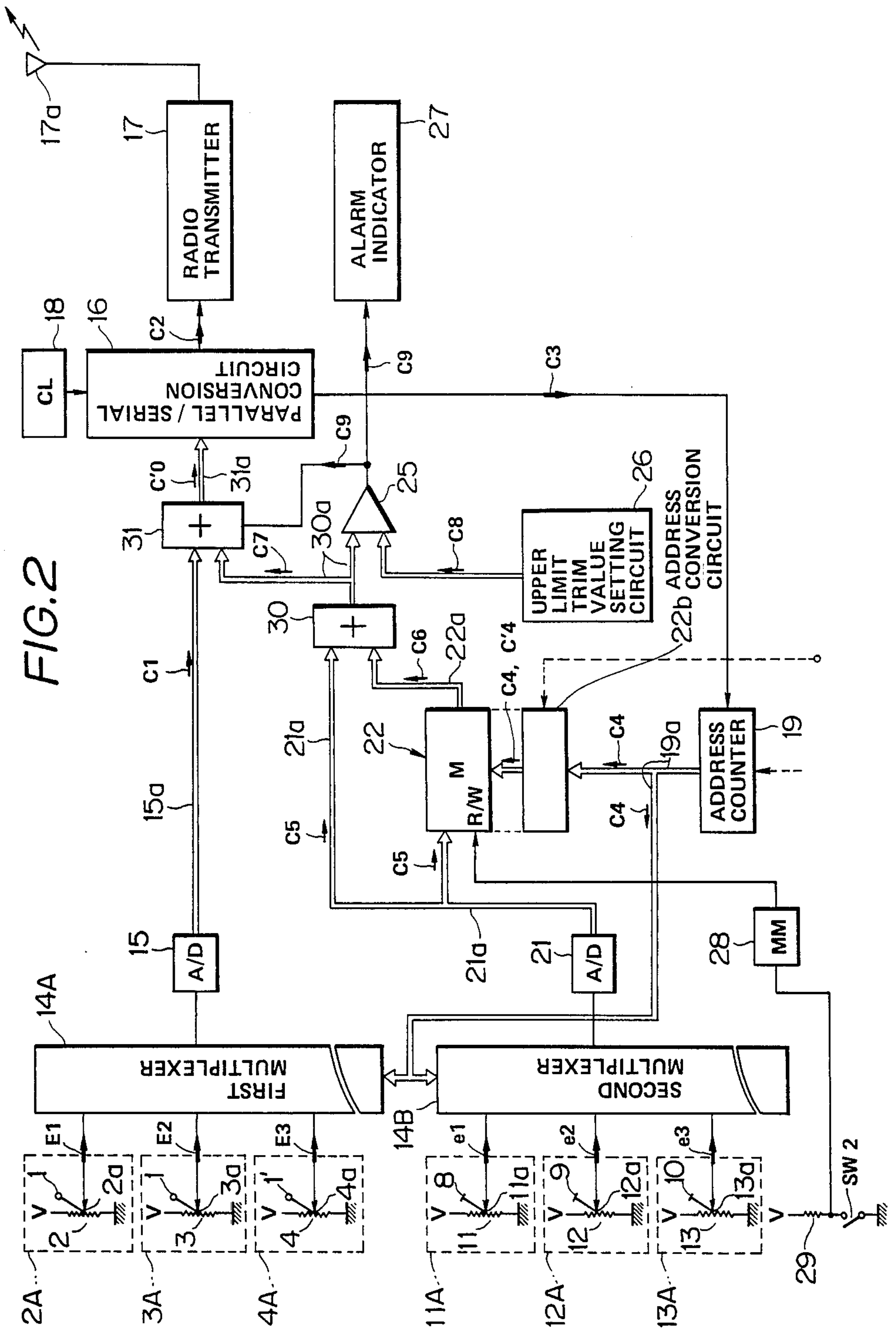
FIG. 2 is a block diagram showing another embodiment of a trim control device for a radio remote control system for a model drive unit according to the present invention.

As can be seen from the foregoing, the second embodiment shown in FIG. 2 is so constructed that the immediate trim control voltage codes C7 comprising the previous trim control voltage codes C6 concerned with the controlled object previously controlled and the trim control voltage codes C5 at the time of the current control which have been added in the first digital adder 30 are added in the second digital adder 31 to the main control voltage codes C1 at the time of the current control operation to form the parallel control voltage codes C'0, which are supplied to the parallel/-serial conversion circuit 16 and converted into the parallel/serial transmission codes C2 therein.

As described above, in the present invention, the trim control voltage code memory is provided which is adapted to separately readably store the trim control voltage codes respectively representing the trim control voltages of the trim controllers concerned with the controlled object previously controlled. Such construction allows each of the trim control voltage codes corresponding to the positions of the trim controllers during the previous control operation to be read out from the trim control voltage code memory during the re-control operation of the same controlled object, so that the repeated trim adjustment of the controlled object of which the trim adjustment was completed may be eliminated to essentially simplify the troublesome trim adjustment.

Also, the present invention may be so constructed that the digital adder is provided which is adapted to carry out addition of the trim control voltage codes of the previously controlled object read out from the trim control voltage code memory and the trim control voltage codes concerned with the same controlled object currently controlled, in addition to the trim control voltage code memory. Such construction permits a variation of a proper value of each of the trim control voltages of the same controlled object with time due to meteorological conditions between the previous control operation and the current one to be effectively compensated by the trim adjustment during the current control operation, so that a secondary disadvantage contingent to the above-described advantage of the present invention that the trim control voltages are semifixed due to the storing of the voltages may be eliminated to more effectively ensure the above-described advantage of the present invention.

While preferred embodiments of the invention have been described with a certain degree of particularity with reference to the drawings, obvious modifications and variations are possible in the light of the above teachings. It is therefore to be understood that within the scope of the appended claims, the invention may be practiced otherwise than as specifically described.

What is claimed is:

1. A trim control device for a radio remote control system for a model drive unit comprising a transmission section comprising:
   - main control voltage generating circuits for generating main control voltages corresponding to displacement of control levers;
   - a first analog to digital converter for converting said main control voltages to parallel digital codes and outputting said digital codes in the form of main control voltage codes therefrom;
   - a parallel/serial conversion circuit for converting control voltage codes derived from said main control voltage codes from said first analog to digital converter to serial transmission codes and outputting said serial transmission codes therefrom;
   - a radio transmitter for transmitting said transmission codes of said parallel/serial conversion circuit toward a radio receiver in a receiving section;
   - trim control voltage generating circuits for generating trim control voltages depending upon displacement of trim controllers;
   - a second analog to digital converter for converting trim control voltages to parallel digital codes and outputting said digital codes in the form of trim control voltage codes therefrom;
   - a trim control voltage memory for readably storing said trim control voltage codes therein; and
   - a digital adder for carrying out addition of previous trim control voltage codes read out from said trim control voltage code memory and said main control voltage codes output from said first analog to digital conversion circuit and supplying a result of said addition in the form of the control voltage codes to said parallel/serial conversion circuit.

2. A trim control device for a radio remote control system for a model drive unit comprising a transmission section comprising:

main control voltage generating circuits for generating main control voltages corresponding to displacement of control levers;

a first analog to digital converter for converting said main control voltages to parallel digital codes and outputting said digital codes in the form of main control voltage codes therefrom;

a parallel/serial conversion circuit for converting control voltage codes derived from said main control voltage codes from said first analog to digital converter to serial transmission codes and outputting said serial transmission codes therefrom;

a radio transmitter for transmitting said transmission codes of said parallel/serial conversion circuit toward a radio receiver in a receiving section;

trim control voltage generating circuits for generating trim control voltages depending upon displacement of trim controllers;

a second analog to digital converter for converting trim control voltages to parallel digital codes and outputting said digital codes in the form of trim control voltage codes therefrom;

a trim control voltage memory for readably storing said trim control voltage codes therein;

a first digital adder for carrying out addition of previous trim control voltage codes read out from said trim control voltage code memory and said trim control voltage codes output from said second analog to digital conversion circuit and outputting a result of said addition in the form of immediate trim control voltage codes therefrom; and a second digital adder for carrying out addition of said immediate trim control voltage codes from said first digital adder and said main control voltage codes from said first analog to digital converter and supplying a result of said addition in the form of the control voltage codes to said parallel/serial conversion circuit.

* * * * *